US005311667A

United States Patent [19]

Jambor

[11] Patent Number: 5,311,667
[45] Date of Patent: May 17, 1994

[54] METHOD AND APPARATUS FOR ADJUSTING LINE WIDTH IN A SIGN ENGRAVING MACHINE

[75] Inventor: George F. Jambor, Cedarburg, Wis.

[73] Assignee: Brady USA, Inc., Milwaukee, Wis.

[21] Appl. No.: 24,978

[22] Filed: Mar. 2, 1993

[51] Int. Cl.[5] .......... B41C 1/02; B23C 9/00

[52] U.S. Cl. .......... 33/18.1; 33/26; 409/80

[58] Field of Search .......... 33/18.1, 23.11, 26, 33/32.1, 32.3, 626, 628; 409/79, 80; 400/20, 18, 31

[56] References Cited

U.S. PATENT DOCUMENTS

| | | | |
|---|---|---|---|
| 1,906,490 | 5/1933 | Sloan et al. . | |
| 1,998,893 | 4/1935 | Cole et al. . | |
| 2,378,830 | 6/1945 | Chaddock . | |
| 2,445,903 | 7/1948 | Bentzman . | |
| 2,524,636 | 10/1950 | Preis et al. | 33/18.1 |
| 3,447,581 | 6/1969 | Stromquist . | |
| 3,458,209 | 7/1969 | Scholz . | |
| 3,524,382 | 8/1970 | Artaud . | |
| 4,404,598 | 9/1983 | Scuilli . | |
| 4,523,865 | 6/1985 | Schacht | 33/18.1 |
| 4,688,973 | 8/1987 | Andert et al. . | |
| 4,805,312 | 2/1989 | Dätwyler | 33/18.1 |
| 4,836,721 | 6/1989 | Campling . | |
| 4,854,205 | 8/1989 | Anderka | 33/18.1 |
| 4,956,786 | 9/1990 | Drummond et al. . | |
| 5,011,343 | 4/1991 | Saban et al. . | |

*Primary Examiner*—William A. Cuchlinski, Jr.
*Assistant Examiner*—C. W. Fulton
*Attorney, Agent, or Firm*—Quarles & Brady

[57] ABSTRACT

A method and apparatus for automatic line width adjustment for engraving characters on a piece of sign material utilizes two cutters sliding by each other in face-to-face opposing relationship. Line width is controlled by controlling the spacing between a pair of cutter tips. The two cutters are moved over a portion of a sign blank while being rotated with the selected spacing between the cutter tips to effect a selected cutting width. The cutters are held in holders and are replaceable when worn out. An internal ratchet-and-pawl mechanism provides fifteen different cutter line widths. The cutter head is moved into engagement with an external pawl mechanism to operate the internal ratchet-and-pawl mechanism.

6 Claims, 8 Drawing Sheets

METHOD AND APPARATUS FOR ADJUSTING LINE WIDTH IN A SIGN ENGRAVING MACHINE

BACKGROUND OF THE INVENTION

1. Field of the Invention

The field of the invention is machines for cutting metal or plastic, and more particularly sign engraving machines for engraving lines of limited depth on a sign blank to form text characters and other sign graphics.

2. Description of the Background Art

It is typical in machines for cutting metal and plastic to have some type of replaceable cutters. Cutting bits are replaced when they wear out. Cutting bits are also replaced to adjust the size or type of cut.

Cutting bits have been secured in chuck heads, which are opened to release the bits, and which are closed to secure the bits. Cutting bits have also been held in place with fasteners. The use of fasteners requires the use of tools for replacing or changing cutters with a new set.

The present invention was made in response to a need to provide quick, easy and powered adjustments in engraveable line width in a sign engraving machine. The present invention was also directed to providing a number of different sizes of text on a sign.

SUMMARY OF THE INVENTION

The invention provides a method and apparatus for automated line width adjustment for engraving a line on a sign blank.

In the method, a first planar cutter is positioned for movement along a first path, the first cutter having a first cutter tip projecting along an axis running substantially perpendicular to the first path. A second planar cutter is positioned for movement along a second path in face-to-face opposing relationship to the first planar cutter, the second cutter having a second cutter tip projecting along an axis running substantially perpendicular to the second path. The first and second cutters are then moved along their respective paths to select the spacing between the cutter tips.

The two cutters are moved over a portion of a sign blank while being rotated with the selected spacing between the cutter tips to effect a cutting width. The two cutters are equally spaced from an axis of rotation to maintain rotational balance at all indexed positions.

The apparatus for practicing this method includes a first cutter assembly and a second cutter assembly for movement along the respective paths in face-to-face opposing relationship; a mechanism for advancing the first and second cutter assemblies between a home position and a fully advanced position to select the spacing between the cutter tips; a mechanism for releasing the cutter tips to return to the home position; and a control mechanism for operating, in the alternative, either the mechanism for advancing or the mechanism for releasing, to control the spacing between the cutter tips.

The two cutter system allows line width to be controlled by a mechanical movement of parts in the cutter head, while still maintaining a sufficiently tight assembly of the parts to endure cutting operations in plastic or metal. When an engrave command is entered through a keyboard unit, an electronic control drives several motors to engage an external ratchet-and-pawl mechanism to adjust the width of the cutters. An advantage of the invention is that the indexing of the cutter tips can be accomplished with the same motors which are used for engraving.

This automated adjustment of the cutters saves cutter bit changes, which increases productivity of the machine in handling different sign engraving jobs. It also makes the machine easier to use than prior sign engravers, because the adjustment is performed automatically during sign engraving operations.

Other objects and advantages, besides those discussed above, shall be apparent to those of ordinary skill in the art from the description of the preferred embodiment which follows. In the description, reference is made to the accompanying drawings, which form a part hereof, and which illustrate examples of the invention. Such examples, however, are not exhaustive of the various embodiments of the invention, and therefore reference is made to the claims which follow the description for determining the scope of the invention.

DETAILED DESCRIPTION OF THE PREFERRED EMBODIMENTS

Figure 1:
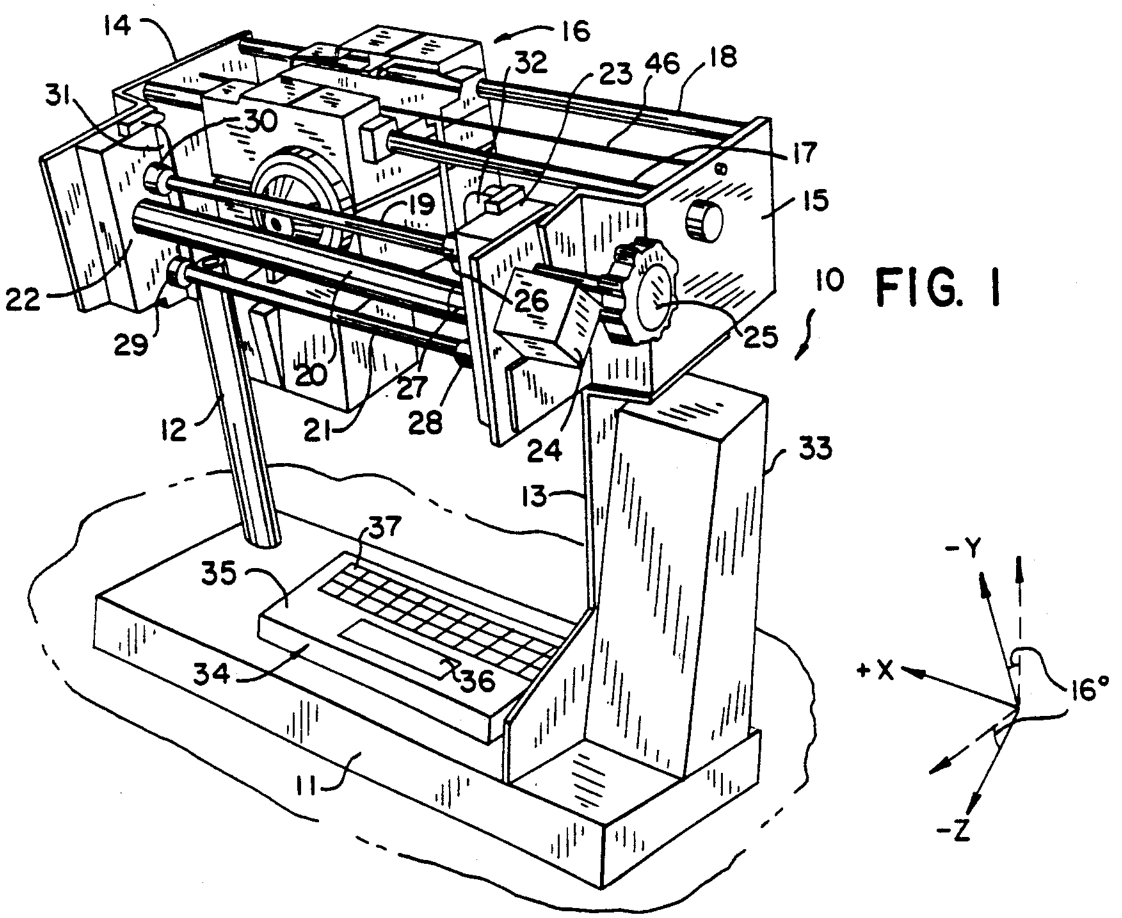
FIG. 1 is a perspective of a sign engraving machine which incorporates the present invention.

The method and apparatus of the invention are embodied in a sign engraving machine 10 seen in FIG. 1. The machine is supported on a base 11 by left tubular support 12 and right sheet metal support 13 as seen from the working side of the machine 10 in FIG. 1. Left and right sidewalls 14 and 15 are mounted on the supports 12, 13, respectively. Enclosures which fit over the outside of the sidewalls have been removed for a better view of the parts of the machine 10.

It should be understood that the terms "left" and "right" shall be used herein as the machine is viewed in FIG. 1. In actual usage of the machine, "left" and "right" are determined from viewing the machine 10 from the user's point-of-view, which is to say, behind the machine as seen in FIG. 1, and the opposite of the viewpoint of the description herein.

The upper portion of the machine 10 provides a carriage mechanism for the engraving assembly 16 and associated mechanisms. The engraving assembly 16 is moved transversely along an x-axis on two traverse rods 17, 18 which are mounted between sidewalls 14 and 15 shown in FIG. 1.

The upper portion of the machine is tilted forward at an angle of 16°. Therefore, a z-axis is defined as being at an angle of 16° below horizontal (first dashed arrow in FIG. 1) and is orthogonal to the x-axis. A y-axis is defined as being rotated forward at an angle of 16° relative to vertical (second dashed arrow in FIG. 1).

Three sprocket drive bars 19, 20, 21, are mounted by bearing housings 22, 23, which are, in turn, mounted on the inner front sides of sidewalls 14 and 15. The sprocket drive bars 19, 20, 21, extend horizontally in front of the engraving assembly 16 and feed the sign blank (not shown in FIG. 1) and its carrier (not shown) upwardly in a vertical direction until turned parallel to the y-axis when reaching the lowest sprocket drive bar 21. The sprocket drive bars are driven by a y-axis stepper motor 24, and may also be operated manually using knob 25. The sign carrier material (not shown) comprises plastic material with holes punched along opposite edges. The plastic material is held on the sprockets 26, 27, 28, 29 and 30 by spring-biased hold-down members 31 and 32 (also seen in FIG. 2). Sign blanks are releasably attached to and extend between the two series of holes.

Figure 18:
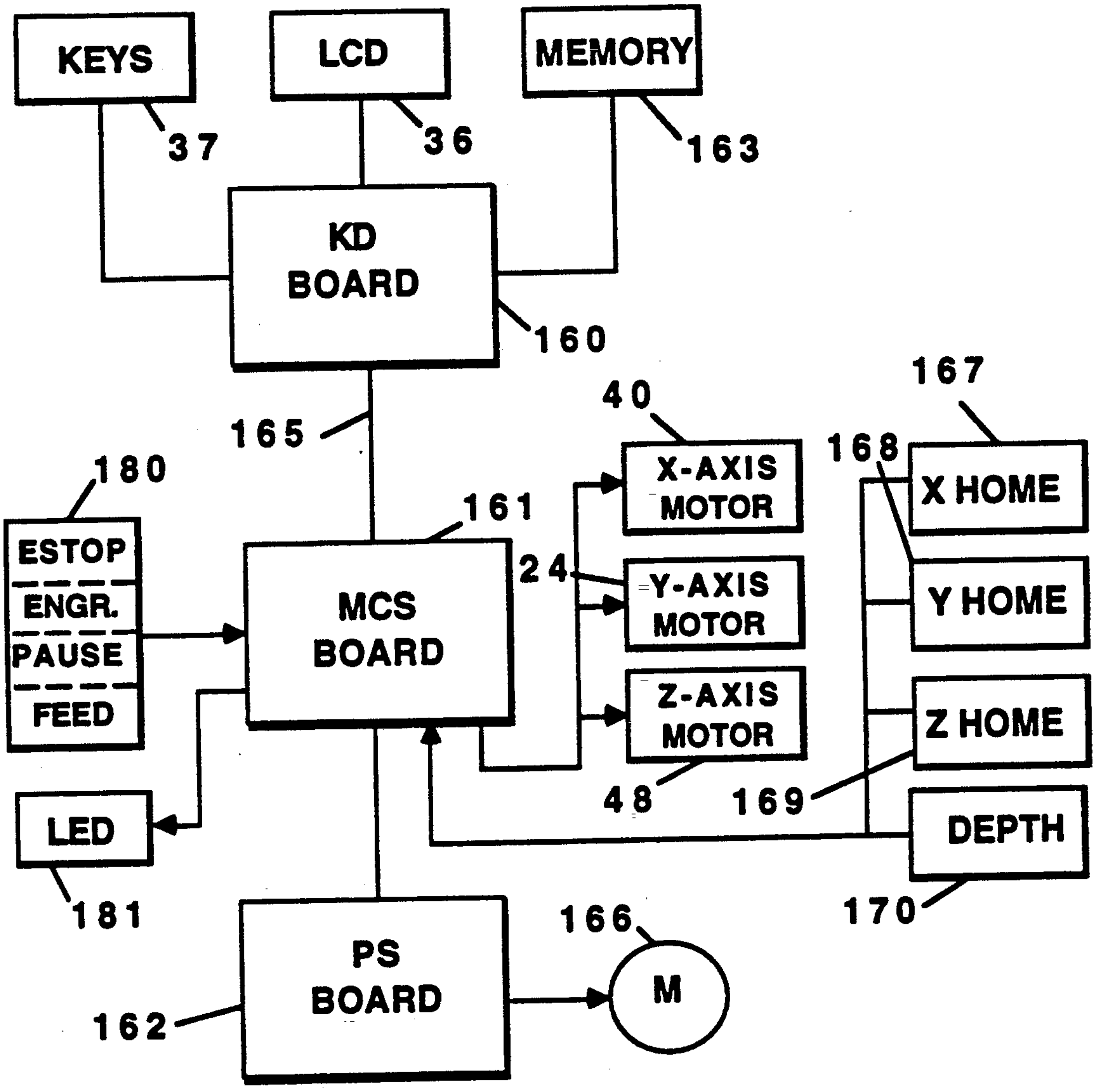
FIG. 18 is a block diagram of the electrical control system of the sign engraving machine of FIG. 1.

Along the right support is an upstanding enclosure 33 for a power supply circuit board 162 (FIG. 18). A motor control system (MCS) circuit board 161 (FIG. 18) is housed in the base 11 and a keyboard-display (KD) circuit board 160 (FIG. 18) is housed in keyboard housing 35, which may be placed on base 11 when not in use. A keyboard-display (KD) module 34 in FIG. 1 includes housing 35, the circuit board 160 (not seen in FIG. 1), an LCD display 36 and a set of keys 37. KD module 34 communicates with the MCS circuit board 161 (FIG. 18) and connects to the power supply circuit board 162 (FIG. 18) in enclosure 33 through wires in a cord which resembles a coiled telephone cord (not shown in FIG. 1).

The motor drive mechanisms for moving the engraving head assembly 16 along the x-axis and the z-axis shall now be described with reference to FIGS. 1, 2 and 3. As seen best in FIG. 2, a case 38 for the the engraving head assembly 16 slides along traverse rods 17, 18, on low-friction bushings 39-1, 39-2, 39-3 and 39-4. Inside the case 38, an x-axis drive includes an x-axis stepper motor 40 (FIG. 3) and the following connecting parts. A pinion gear 41 is disposed on an output shaft of this motor 40. This gear meshes with a large spur gear 42. Gear 42 and capstan 43 are mounted on a horizontally disposed axle 44 mounted by bracket 45. Capstan 43 rotates with spur gear 42 and pulls the case and engraving head assembly along wire 46 (FIGS. 1 and 2), which is wrapped several turns around the capstan 43 which is tensioned with a spring attachment 47 mounted on the left sidewall 14 (FIG. 2).

Referring again to FIG. 3, a z-axis drive mechanism includes a stepper motor 48 which is mounted behind the x-axis stepper motor 40, and further includes the following connecting parts. A pinion gear 49 is disposed on an output shaft and engages spur gear 50. Capstan 51 rotates with spur gear 50 and both are mounted on axle 52, which in turn is mounted on bracket 53. Spring-tensioning mechanism 54 is arranged to tension z-axis slide wire 55, as seen in FIGS. 2 and 3. Stepper motor 48 is activated to move the engraving head assembly 16 back and forth in the z-direction, with movement into the workpiece being considered in the negative direction.

Figure 3:
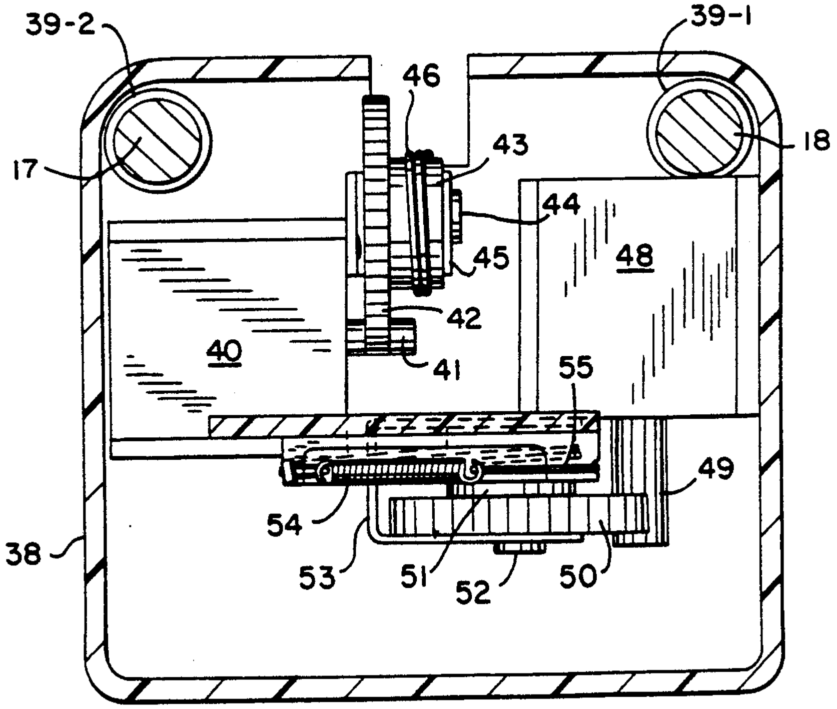
FIG. 3 is a sectional view taken in the plane indicated by line 3—3 in FIG. 2.
Figure 2:
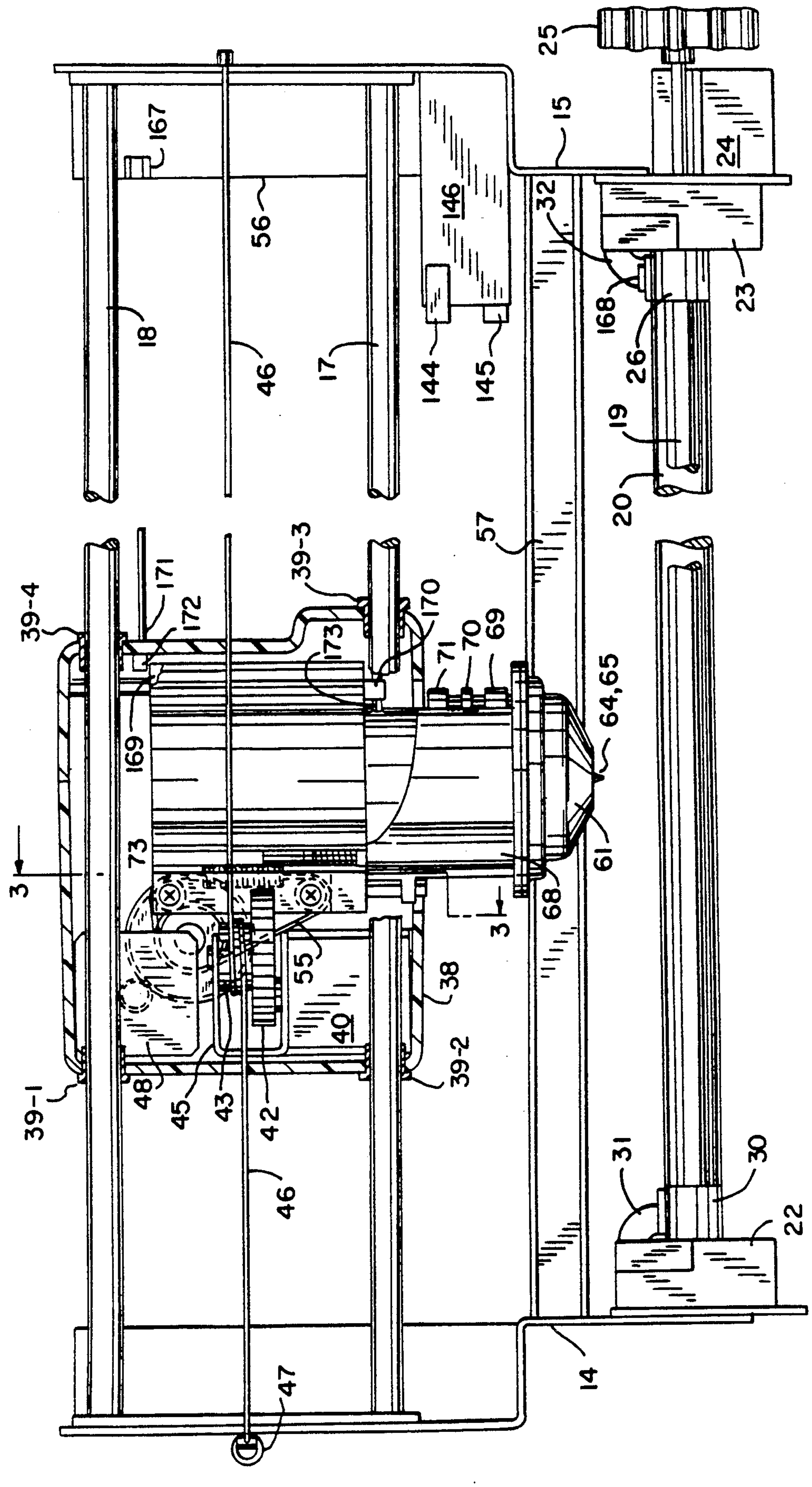
FIG. 2 is a top plan view of the upper portion of the sign engraving machine of FIG. 1.
Figure 4:
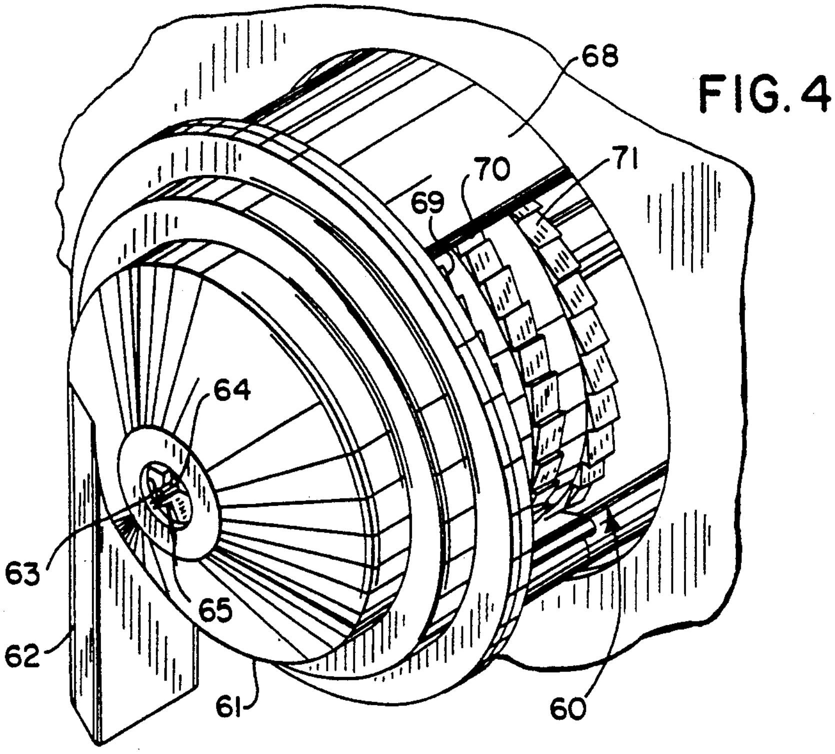
FIG. 4 is an enlarged, perspective view of a cutter head assembly seen in FIG. 1.

Referring next to FIG. 4, in addition to FIGS. 1-3, the engraving head assembly 16 includes a cutter head assembly 60 enclosed on one end by guide member 61. The guide member 61 is part of an exhaust system for chips which are produced during engraving operations on sign material, which may be plastic or a metal, for example, aluminum or brass. The guide member 61 is preferably formed of Delrin plastic. When engraving, the cutter tips 64, 65 project through an access opening 63 in the guide member 61.

The guide member 61 includes an exhaust chute 62 which is aimed downwardly. The lower end of this exhaust chute 62 normally would enter a collection bag (not shown) which has been removed in this instance. For further description of the exhaust system for chips and its related components, reference is made to a copending U.S. patent application of Jambor, entitled "Automatic Chip Removal System for Sign Engraving Machine" U.S. Ser. No. 08/025012 and filed on even date herewith.

The guide member 61 is spring-mounted to the engraving assembly 16 (FIG. 2) by an adapter 68 for movement in the z-direction relative to a pair of cutter tips 64, 65. The tips 64, 65 are formed on a pair of cutter inserts 66, 67 seen in FIGS. 5 and 6 where the guide member 61 has been removed. The adapter 68 has an open side which exposes three toothed ratchet rings 69, 70 and 71 (FIG. 4), referred to as the adjustment ring 69, the return ring 70 and the cap ring 71.

For further description of the cutter inserts 10, 11 (FIGS. 5 and 6), reference is made to a copending U.S. patent application of Jambor, et al., entitled "Cutter Inserts for Sign Engraving Machine" U.S. Ser. No. 08/025013 and filed on even date herewith. The cutter head assembly 60 is rotated at a specified RPM (revolutions per minute) by the spindle motor, which is positioned within an extrusion 73 (FIG. 2), which is suitably mounted to the casing 38 as described in the copending application of Jambor, entitled "Automatic Chip Removal System for Sign Engraving Machine", as more fully cited above. The spindle motor rotates the tips 64, 65 in a circular cutting pattern. At the same time, either the cutter head assembly 60 is moved transversely by an x-axis drive mechanism, as described previously, or the sign material is fed along the y-axis, so that there is relative movement between sign material and the cutter head assembly. The term "relative movement" of the cutter head in relation to the sign material shall include either of these two types of motion or both types. This results in a cutting action on a sign blank 77, illustrated in FIG. 10, in which the overlapping circular cuts define the width of a line, for example, curved, straight or diagonal. Lines 74, 75, 76 of three different widths are illustrated in FIG. 10.

Figure 6:
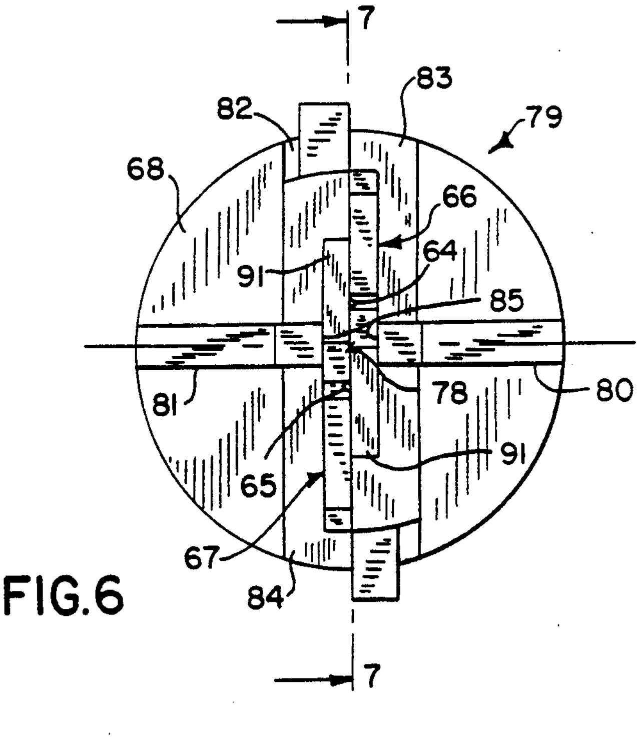
FIG. 6 is a front end view of the cutter head of FIG. 5.

The cutter inserts 66, 67 are mounted in a chuck head 68 and operable for movement in face-to-face relationship along adjacent paths as seen in FIG. 6. The cutter inserts 66, 67 are positioned to extend from a central axis of rotation 78 of the chuck head assembly 79 at 0° and 180°, respectively, relative to the central axis 78. A pair of fixed cutter wings 80, 81 (FIG. 6) extend along radial axes lines disposed at 90° and 270°, respectively, in a clockwise direction relative to the central axis 78. The cutter wings 80, 81 are integrally formed with chuck head 68. The chuck head 68 has a central channel 82 aligned longitudinally along the 0°-180° axis. A pair of cutter insert holders 83, 84 are disposed in the central channel 82 for movement along two respective paths and in sliding face-to-face relationship along the 0°-180° axis.

The cutter wings 80, 81 have a gap 85 (FIG. 6) between them. This gap 85 is sized at twice the thickness of one of the cutter inserts 66, 67, so that the cutter inserts 66, 67 are laterally supported against spreading apart. The cutter wing support allows for less stringent specifications for the holders 83, 84.

Figure 5:
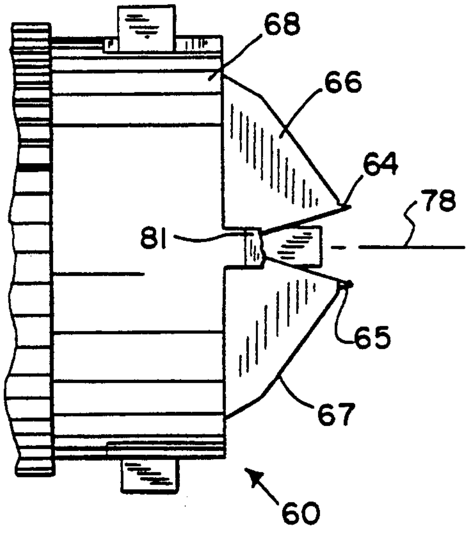
FIG. 5 is a side elevation view of the cutter head of FIG. 4, with a guide member removed.
Figures 9, 10, 11A, 11B, 11C:
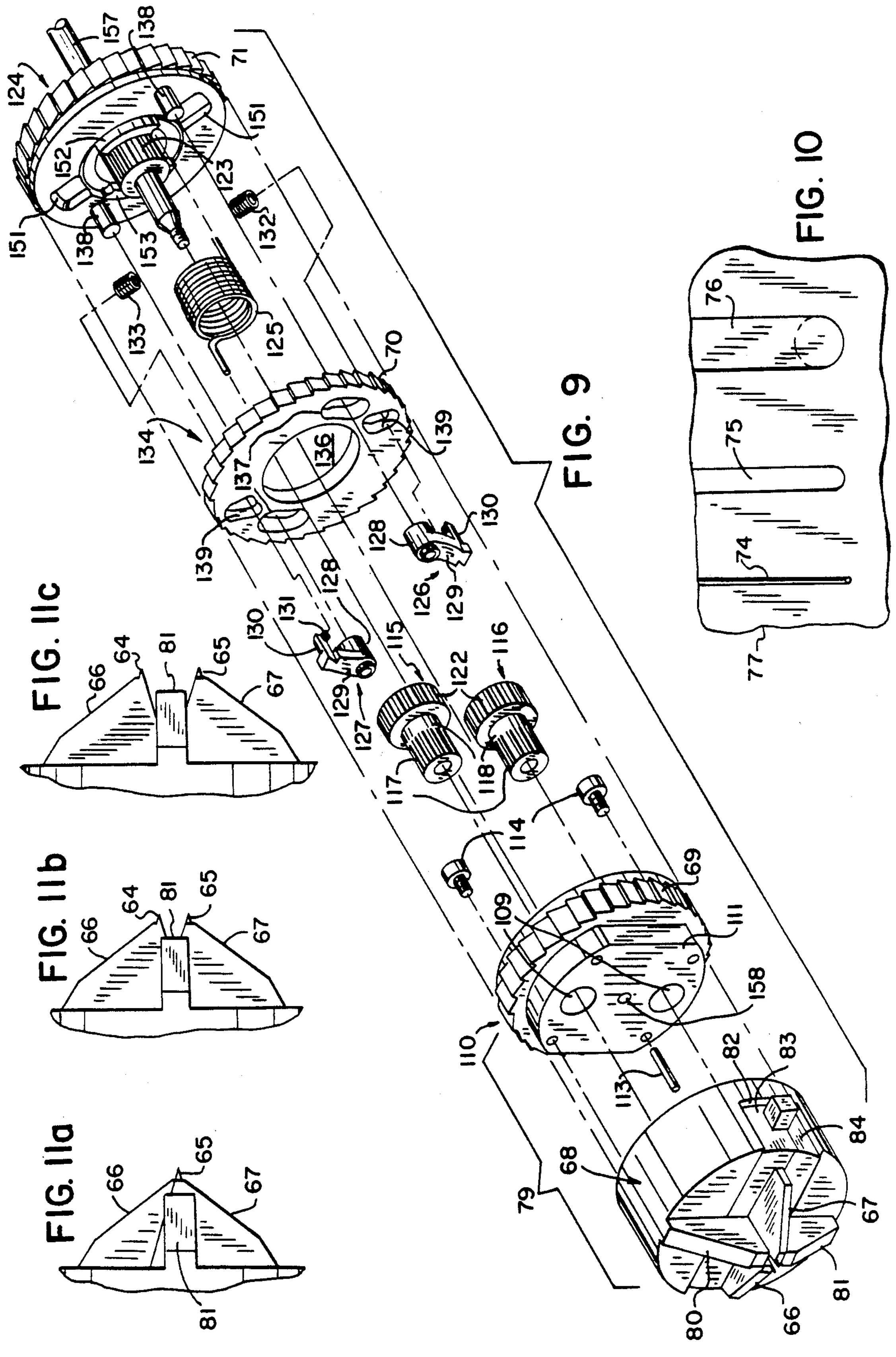
FIG. 9 is an exploded view of the cutter head assembly of FIGS. 5-7.
FIG. 10 is a plan view of three lines of different width engraved on a sign blank.
FIGS. 11*a*-11*c* are three detail views showing the different positions of the cutters of FIGS. 6-7.

FIGS. 11*a*-11*c* show the cutter inserts 66, 67 in three respective positions. FIGS. 5, 6 and 11*c* show the cutter tips 64, 65 in their wide-open position with the holders 83, 84 spread their maximum distance in opposite directions along the 0°-180° axis. FIG. 11*a* shows the cutter tips 64, 65 in their "closed" or "cutter home" position with the holders 83, 84 closed to a minimum distance in opposite directions along the 0°-180° axis. FIG. 11*b* show the cutter tips 64, 65 in an intermediate position between the wide-open position and the closed position. The outside edges of the tips 64, 65 of the cutters 66, 67 can be moved to one of 15 positions, from approximately 0.03 inches to approximately 0.25 inches, between the closed and wide-open positions, the positions being spaced approximately 0.015 inches apart.

Figure 7:
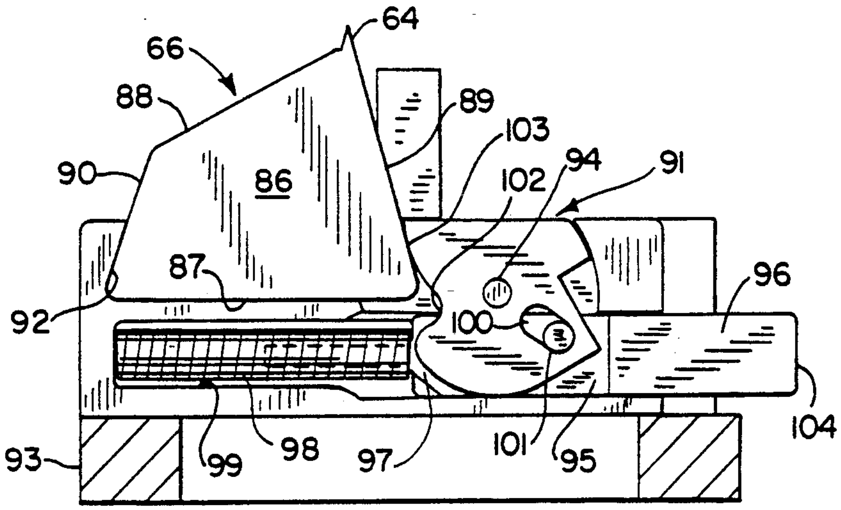
FIG. 7 is a sectional view taken in the plane indicated by line 7—7 seen in FIG. 6.
Figure 8:
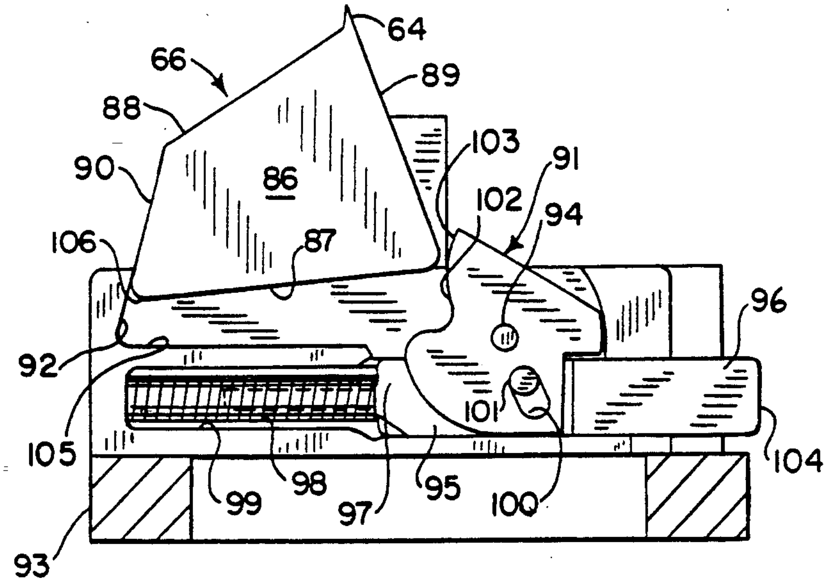
FIG. 8 is a view of the apparatus of FIG. 7 in a second position.

The shape of one of the cutter inserts 66 is seen in FIGS. 7-8, the other cutter insert 67 being of identical shape to the illustrated insert 66. Each cutter insert 66, 67 has a body of quadrilateral shape, including inner face 86, a top edge 87 and a bottom edge 88 (both inverted in FIGS. 7-8), an inside edge 89 and an outside edge 90. Each cutter insert 66, 67 also has a thickness dimension between inner face 86 and an outer face, which provides edges 87-90 with a thickness as seen in FIG. 6.

Referring to FIGS. 7-8, the cutter inserts 66, 67 are secured in their respective holders 83, 84 by a cam 91 which is shown holding the insert 66 against an inner retaining wall surface 92 of the holder body 93. The cam 91 is pivoted on a central axle 94. The cam 91 is received in a slot 95 in plunger 96 of rectangular cross section. A stop 97 formed by a narrowing of the plunger 96 bears against a reaction spring 98 held in spring cage 99 in the holder body 93. The cam 91 has a slot 100 which receives a pin 101 projecting laterally from plunger 96. When the plunger 96 is moved longitudinally, the pin 101 moves in slot 100, engaging the peripheral surfaces formed by slot 100, to translate the linear movement of the plunger 96 to rotational movement of the cam 91. The cam 91 includes a rounded notch 102 with an apex extending outwardly from the holder 93 to form a camming surface 103 that bears on the inside edge 89 of the cutter insert 66.

To operate a cutter insert release mechanism, a tip 104 of the plunger 96 is pressed inward to compress spring 98 while rotating cam 91 clockwise as seen in FIG. 7 to release the inside edge 89 of the insert 66, and allow it to move sideways and clear the retaining wall surface 92.

To install the cutter insert 66, the tip 104 of plunger 96 is pressed inward to compress spring 96 while rotating cam 91 clockwise as seen in FIG. 8. The cutter insert 66 is inserted into position with its top edge 87 (shown inverted) resting on surface 105 and with an apex 106 formed by its top edge 87 and outside edge 90 engaging retaining wall surface 92. The plunger 96 is then released, allowing cam 91 to rotate counterclockwise, as seen in FIGS. 7-8, to bring camming surface 103 into engagement with inside edge 89. This results in the cutter inserts 66, 67 being held on three sides 87, 89 and 90 and controls the depth of insertion into holders 83, 84 without calibration. During rotation of the cutter head 12, the holders 17, 18 are spun around the central axis of rotation 78, such that the plungers 96 are flung outward by centrifugal action, which tends to increase the force with which the plungers 96 and cams 91 hold the cutter inserts 10, 11 in place.

Figure 16:
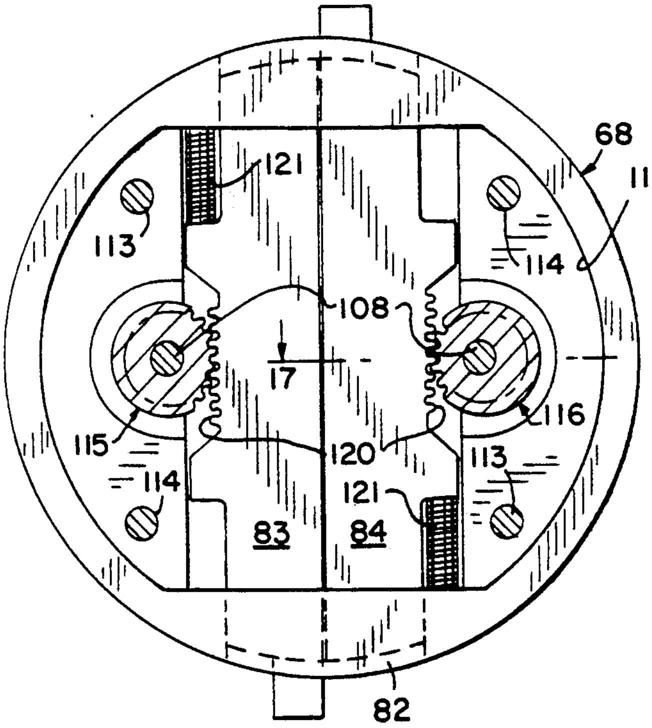
FIG. 16 is a sectional view taken in the plane indicated by line 16—16 in FIG. 13.
Figure 17:
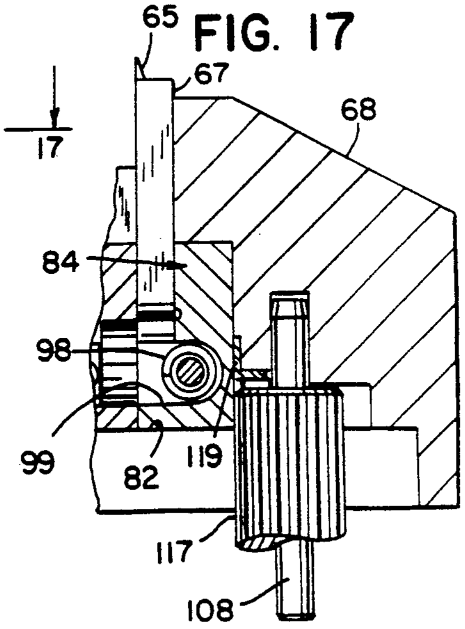
FIG. 17 is a sectional view taken in the plane indicated by line 17—17 in FIG. 16.

FIG. 9 shows an exploded view of cutter head assembly 60. Chuck head assembly 79 includes a chuck 68 and a chuck cap 110 with a plug portion 111 having flatted sides which fits into a similarly-shaped top opening 112 in chuck head 68 as seen in FIG. 16. Two pins 113 are used for locating the chuck cap 110 and two socket-head cap screws 114 seen in FIGS. 9 and 16 are used to secure the chuck cap 110 to the chuck 68. Returning to FIG. 9, the chuck cap 110 has teeth forming the ratchet adjustment ring 69, the teeth being engaged by a pawl 145 (FIG. 14) to move the chuck cap 110 in a clockwise direction. A pair of step gears 115, 116 form pinion gears 117 on shafts 118 that fit through holes 109 in chuck cap 110. The step gears 115, 116 rotate on spindles 108 seen in FIG. 16. These are provided by dowels inserted into the chuck cap 68 as seen in FIG. 17.

Figure 14:
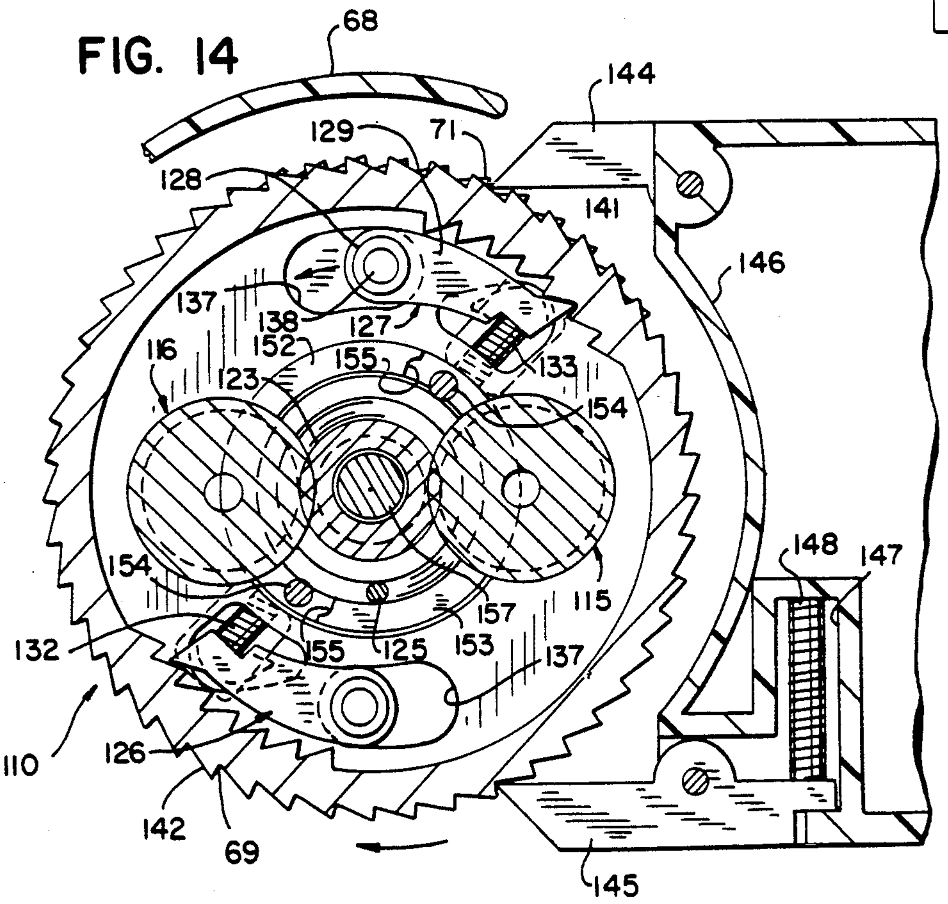
FIG. 14 is a sectional view taken in the plane indicated by line 14—14 in FIG. 12.

Referring to FIGS. 9 and 14, the caps of gears 115, 116 form spur gears 122 which are driven by a pinion gear 123 extending from the underside of a pawl cap 124. The pinions 117 on the step gears 115, 116 engage racks 120 (FIG. 16) to move the holders 83, 84 along their opposite and adjacent paths within channel 82. As seen in FIG. 16, when gear 123 is rotated in one direction, gears 115 and 116 will both be rotated in a common direction opposite the rotation of gear 123, but due to their respective positions, holders 83, 84 will be driven in opposite linear directions. Two compression springs 121 are provided for the holders 83, 84, as shown in FIG. 16, to provide a tighter assembly and to reduce backlash. Also to be noted in FIG. 17 is a leaf-type, anti-vibration spring 119 which is inserted between each cutter holder 83, 84 and a respective ledge inside the chuck 68.

A torsion spring 125 (FIG. 9) has one wire end (FIG. 15) that fits in a hole in the chuck cap 68 and another wire end (FIG. 14) that fits in a hole in the pawl cap 124, so as the chuck cap 110 (adjustment ring 69) is moved relative to pawl cap 124 (cap ring 71), the torsion spring 125 is loaded and cutter tips 64, 65 in FIGS. 5, 6 and 11*a*-11*c* move further apart.

Still referring to FIGS. 9 and 14, a pair of internal pawls 126, 127 each include hubs 128 formed around axes of rotation, arms 129 extending arcuately from the hubs 128, fingers 130 extending at a right angle to the arms 129 and parallel to the axes of rotation. There are spring retaining points 131 (FIG. 9) formed at the tips of the fingers 130 to extend into one end of pawl return springs 132, 133 (FIG. 14) which are small coiled compression springs.

A cam ring 134 (FIG. 9) includes the ratchet teeth for the release ring 70 (FIG. 4) formed in the same direction as the adjustment ring 69. The cam ring 134 has a central opening 136 in which torsion spring 125 and the pinion gear 123 on the pawl cap 124 are positioned when the parts are assembled. The cam ring 134 has slots 137 for the pawl hubs 128 to allow the cam ring 134 to rotate without disturbing the pawl hubs 128, which are pivoted on cylindrical posts 138 extending from the underside of the pawl cap 124. Next to the slots 138 in the cam ring 134 are kidney-shaped openings 139 forming camming surfaces which contact the pawl fingers 130 during rotation of the cam ring 134. When cam ring 134 (return ring 70 in FIG. 4) is moved relative to pawl cap 124 (cap ring 71 in FIG. 4), the camming surfaces formed by openings 139, pinch in and release the internal pawls 126, 127, as seen best in FIG. 15. The torsion spring 125 is unloaded to carry pinion gear 123 back to its original home position. As seen in FIG. 14, the inside of a rim on the chuck cap 110 has internal ratchet teeth 141, 142 formed to engage the ends of the internal pawls 126, 127. The teeth 141, 142 are one-half tooth position out-of-phase relative to each other so that while one pawl 127 engages a ratchet tooth 41, the other pawl 126 rests between two teeth 142 on the other side of the chuck cap 110. With seven internal teeth on each side of the chuck cap 112, this provides the fifteen positions corresponding to fifteen different spacings between the cutter tips. The first position is the cutter home position in which no pawl tooth is engaged.

Figure 15:
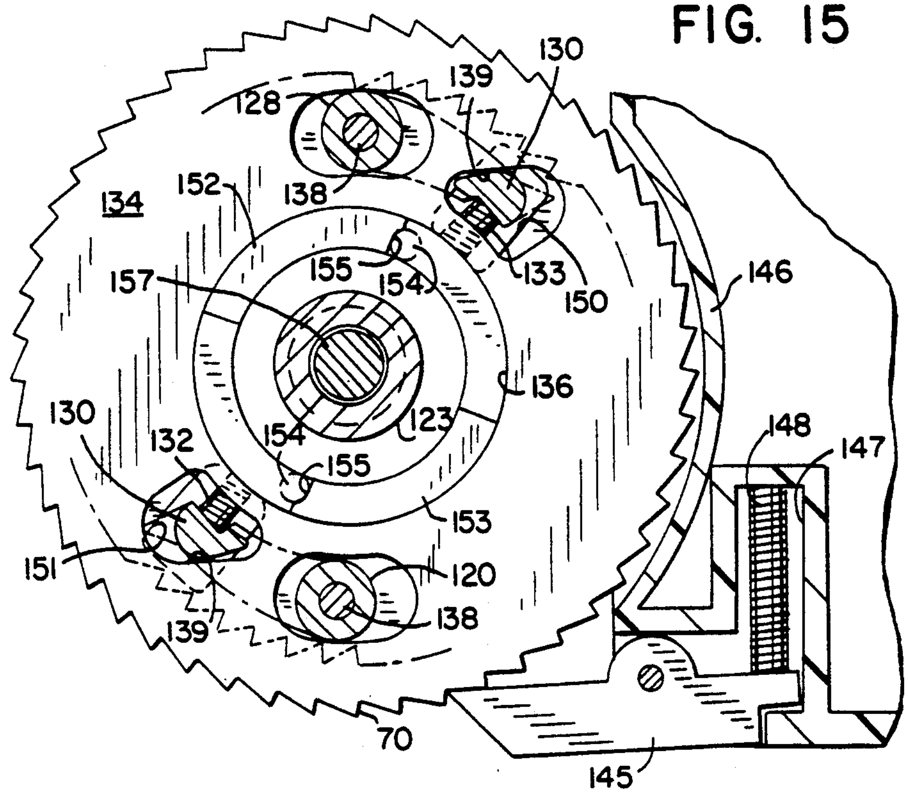
FIG. 15 is a sectional view taken in the plane indicated by line 15—15 in FIG. 13.

The cap ring 71 in FIGS. 4 and 14 is engaged by the external pawl 144 to move in a counterclockwise direction or opposite the direction of movement of the adjustment ring 69 and the return ring 70. Referring again to FIG. 9, besides the pinion gear 123 and the pivot posts 138, mentioned previously, the pawl cap 124 includes some depressions 151 which function as spring cages for the internal pawl springs 132, 133. Two arcuate sectors 152, 153 are formed on the underside of the pawl cap 124, and these fit inside central opening 136 in the cam ring 134 as seen in FIG. 15. Two dowel pins 154 are inserted into the top of the chuck cap 110. When the internal pawls 126, 127 are released to allow the cutter tips 64, 65 to return to their home or closest together position, the dowel pins 154 will contact rounded-out niches 155 in the ends of the arcuate sectors 152, 153, as seen in FIG. 15.

Also shown in FIG. 9, is a drive spindle 157 connecting rotational movement from the spindle axis motor to the cutter head assembly 60. The drive spindle 157 extends through a central opening 156 in the pawl cap which fits within the central opening 136 in the cam ring 134. The drive spindle 157 has a tapered end portion with a threaded tip which engages a tapped hole 158 in the chuck head 68 to fasten the cutter head assembly 60 to the cutter spindle motor. A tapered lock is used to secure the spindle 157 in the tapped hole 158 to provide concentric location. The spindle motor is a permanent magnet DC motor with an unloaded free running speed of 10,000 RPM when run directly from rectified line voltage.

Figure 12:
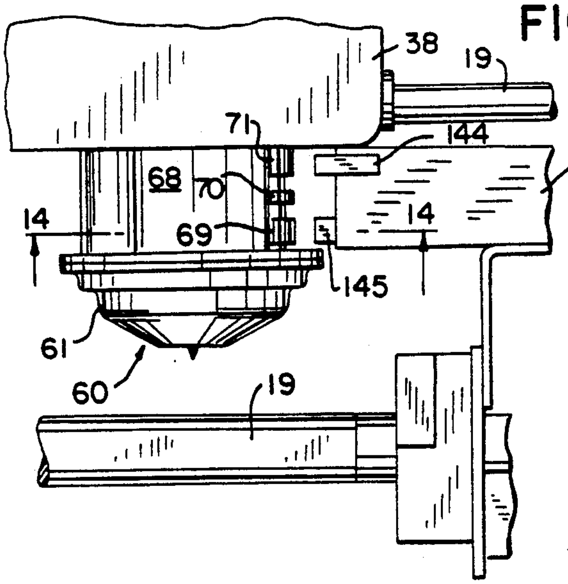
FIG. 12 is a top plan view of the cutter head assembly of FIGS. 5-7 in a first position relative to an external pawl mechanism.
Figure 13:
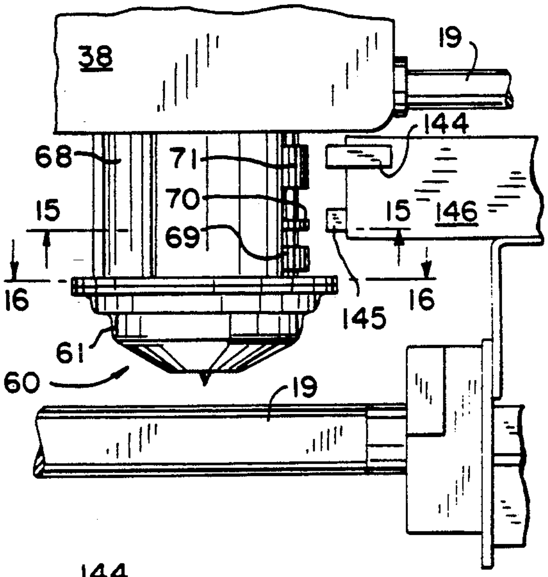
FIG. 13 is a top plan view of the cutter head assembly of FIGS. 5-7 in a second position relative to the external pawl mechanism.

FIGS. 12, 13 and 15 show an external pawl assembly including an external pawl block housing 146, which forms spring cages 147 for holding a compression spring 148 for the lower external pawl 145. A similar construction is provided for the upper external pawl 144. The pair of external pawls 144, 145 are mounted for pivoting, the pawls 144, 145 having internal ends that contact the compression springs 148. The external pawls 144, 145 are positioned one at the bottom of the pawl block housing 146 and one at the top of the pawl block housing 146.

As seen in FIGS. 12 and 13, the upper external pawl 144 is spaced rearward of the lower external pawl 145. When the cutter head assembly 60 is in a "tool adjustment" position seen in FIG. 12, the lower external pawl 145 is aligned in the z-direction with the adjustment ring 69, while the upper external pawl 144 is aligned in the z-direction with one portion of the wider cap ring 71. When the cutter head assembly 60 is in a forward position or "tool home" position, seen in FIG. 13, the lower external pawl 145 is aligned in the z-direction with the release ring 70, while the upper external pawl is aligned in the z-direction with another portion of the wider cap ring 71. The two rings 70, 71 float relative to the spindle 157 of the spindle motor. Ring 69 is attached to spindle 157.

Referring to FIG. 18, the tool adjustment and tool home operations, as well as engraving operations, are controlled by an electronic control. This control includes the KD board 160, which was described earlier as being housed in module 34 in FIG. 1. The KD board 160 (FIG. 18) includes suitable microcomputer circuitry and interfaces to keyboard 37, LCD 36, and a memory cartridge 163. The KD board 160 also communicates with MCS (motor control systems) board 161 through an RS-232 communication link 165. The MCS board 161 includes suitable microcomputer circuitry for processing inputs, controlling the motors and communicating with the KD board 160 through RS-232 link 165.

A power supply (PS) board 162 provides the standard regulated +5 VDC logic power for the KD borard 160 and an unregulated +30 VDC for the motor drive circuits on the MCS board 161.

The KD board 160 controls user interface functions, while the MCS board 161 provides real time control of the I/O (input/output) devices on the machine 10. Output devices include x-axis stepper motor 40, y-axis stepper motor 24, z-axis stepper motor 48 and spindle motor 166. The spindle motor 166 receives power directly from PS board 162. Optical input sensors include an x-axis home sensor 167, a y-axis home sensor 168, a z-axis home sensor 169 and a cutter depth sensor 170. Input controls include pushbuttons 180 for initiating "E-STOP", "ENGRAVE", "PAUSE/PARK" and "FEED" operations. A green LED 181 is provided for signaling when power is on, or when flashing, signals that a cutting job is in the PAUSE mode.

Referring to FIG. 2, the x-axis home sensor 167 is positioned on a shelf 56 mounted inside the right sidewall 15 in alignment with a back end of the casing 38. A finger 171 is mounted to the rear right side of the casing 38. When the engraving assembly 16 is moved close to the right sidewall 15, finger 171 slides in between two legs of U-shaped sensor 167 and interrupts an optical beam to generate an electrical signal to MCS board 161.

Similarly in FIG. 2, there is a z-axis home sensor 169 on the right rear of the extrusion 73 carrying spindle motor 166. When the spindle motor and its extrusion 73 are moved to a z-axis home position, a finger 172 fastened to the inside of casing 38 interrupts the optical beam to generate an input signal to the MCS board 161.

Still referring to FIG. 2, a depth control optical sensor 170 is positioned at the front right of the motor carrier extrusion 73 and a finger 173 formed on adapter 68 moves with the guide member 61 to interrupt an optical beam provided by sensor 170. This cutter depth sensor 170 senses the relation of the cutter tips 64, 65 to a contact nose surface on the guide member 61. In the "pen up" position the beam is interrupted. As the cutter tips 64, 65 are plunged to engraving depth, the beam is cleared to send a signal to the MCS board 161. The difference between a cutter withdrawn ("pen up") position and the full plunge ("engraving") position is approximately 0.040 inches.

As the cutter tips 64, 65 are plunged into the material, the guide member 61 presses upon the material due to its spring mounting as more particularly described in the copending applications cross-referenced herein.

Lastly, in FIG. 2, there is a y-axis optical sensor 168 mounted on hold-down member 32 for sensing one or more notches in the edge of the sign blank carrier. The carrier has holes which are engaged by pin-feed sprockets 26–30 to feed the sign blanks upward along the y-axis in front of the engraving assembly 16.

Wires for the motors and sensors in the engraving assembly 16 are supported in a wiring harness channel 57 running under the engraving assembly 16 as seen in FIG. 2.

Along the x-axis, motion of the cutter head 60 from right to left in FIG. 1 is defined as positive. Motion towards the external pawl block 146 is defined as negative. On the y-axis, upward motion of the material is defined as negative. Motion of the cutter head 60 along the z-axis to penetrate the sign material is defined as negative travel. The spindle motor 166 drives the cutter assembly 60 directly. The assembly 60 rotates counterclockwise looking at the motor from the direction of FIG. 1.

Only the right (negative) end of the x-axis travel is sensed by the x-axis home sensor 167 (FIG. 2). This provides a "touchoff point" for resetting the x-axis absolute position, as well as defining the extent of the cutter tip adjustment zone. The touchoff operation will be performed on the x-axis for each sign or tag that is engraved, so that missed steps cannot accumulate to a large difference between the position counter and actual position.

The x-axis motor is preferably a stepper motor with 0.001 inches per step resolution. A step rate of at least 1000 per second is desired, greater if possible for pen up, straight line moves.

The y-axis has no travel limits because it feeds a continuous carrier. The carrier is marked along the edge with index notches, at least one notch for each sign or tag attached. The y-home sensor 168 detects the index notch, which is used to reset the absolute y-position before each piece is engraved. If the end of the carrier has been reached, the y-axis sensor beam is restored just as in the case where the index notch has been found. It will be necessary to step the y-axis motion further to fine the other edge of the index notch. Failure to find the other edge means end of carrier ("paper out") has been detected.

There are five defined positions for the cutter head assembly 60 along the z-axis: fully retracted (z-axis home), tool adjustment (opening cutter tips), tool home (close cutter tips), pen up, and engraving. The fully retracted position is sensed by the z-axis optical sensor 169, and provides a point to reset the z-axis absolute position. This position is used when feeding a new blank into the work area, so a z-axis absolute position counter cannot accumulate excessive error. The "pen up" position is used for moving between cuts. The z-axis motor is preferably a stepper motor with 0.0005 inches per step resolution.

Once the cutting head assembly 60 is aligned in the z-direction to accomplish either the tool adjustment or tool home, it is moved in the x-direction to engage the pawls 144, 145 utilizing the x-axis drive, the x-axis home optical sensor 167 and the electronic controls of FIG. 18. A certain number of stepper motor steps relative to the x-axis sensor 167 represents an engagement with the external pawls 144, 145 which effects movement of the ratchet rings 69, 70, 71.

The sign engraving machine 10 adjusts line width automatically, in response to a command to engrave a line or letter of a different size than the current size. The KD module 34 has keys 37 for manual input of character size, and a key for automatic determination of character size based on the size of the engraveable area, the number of characters in the sign message and other selectable parameters. The KD board 160 (FIG. 18) determines the character size and its position on the sign blank and transmits certain data to the MCS board 161 via RS-232 link 165. This data includes font style, font size, character selection data, character orientation data, and insertion point data.

Upon receipt of this data, the MCS board 161 calculates the next line width setting that is required for the next size of character to be engraved. The next line width setting is compared to the current line width setting. If line width must be changed, a determination is then made whether this change should be made by spreading the cutter tips 64, 65 wider apart or returning them to their home position. If the cutter tips 64, 65 are to be spread wider apart, the MCS board 161 calculates the number of indexed positions or clicks which must be moved to reach that line width setting. The size or line width is then set using the following procedure:

a) Stop the spindle motor 166 if not already stopped.

b) Move the cutter assembly 60 along the x-axis if necessary to increase its distance from external pawls 144, 145.

c) Move the cutter assembly 60 along the z-axis to the tool home position where return ring 70 and cap ring 71 line up with pawls 145, 144, respectively, if the new size is smaller than the current size. If the new size is larger, skip procedures c) and d).

d) Move the cutter assembly 60 along the x-axis to engage pawls 144, 145, and then withdraw along the x-axis. The engagement of the return ring 70 and cap ring 71 brings the cutter tips 64, 65 to the tool home or fully closed position by releasing the internal pawl and ratchet mechanism.

e) Move the cutter assembly 60 along the z-axis to the tool adjustment position where adjustment ring 69 and cap ring 71 line up with pawls 145, 144, respectively, if any iterations of procedure f) are required.

f) Move the cutter assembly along the x-axis to engage rings 69, 71 with pawls 144, 145. The rings 69, 71 can be adjusted from 1 to 4 steps (clicks) relative to each other for each x-axis motion according to distance traveled into the region of external pawls 144, 145. The MCS board 161 determines the number of steps (clicks) from 1 to 15 that must be made to adjust the cutter tips 64, 65 to a wider position to engrave text of the appropriate size. The machine 10 then makes the cutter width adjustment in sets of up to four clicks with any remainder being handled by the last external pawl operation.

g) Move the cutter assembly 60 along the z-axis to a position clear of the tool adjustment and tool home positions.

When not adjusting the cutting width, the cutter head assembly 60 remains suitably spaced from the pawls 144, 145 to avoid engaging the external pawl mechanism.

In the above procedure, the x-axis drive mechanism provides the motive force for opening the spacing of the cutter tips 64, 65 and releasing the internal pawl mechanism to allow spring-driven return of the tips 64, 65 to the closed position. This provides the automatic tool size change for engraving text of different sizes.

This description has been by way of example of how the invention can be carried out. Those of ordinary skill in the art will recognize that various details may be modified in arriving at other detailed embodiments, and that many of these embodiments will come within the scope of the invention. Therefore to apprise the public of the scope of the invention and the embodiments covered by the invention the following claims are made.

I claim:

1. A method of line width adjustment and engraving a line on a piece of sign material, the method comprising:

positioning a first planar cutter for movement along a first path, the first cutter having a first cutter tip projecting along an axis running substantially perpendicular to the first path;

positioning a second planar cutter for movement along a second path in face-to-face opposing relationship to the first planar cutter, the second cutter having a second cutter tip projecting along an axis running substantially perpendicular to the second path and the second path lying adjacent the first path and having a portion running alongside a portion of the first path;

moving the first and second cutters along their respective paths to select the spacing between the first and second cutter tips;

moving the first and second cutters into contact with the piece of sign material;

rotating the two cutters with the selected spacing between the first and second cutter tips to effect a cutting width; and causing relative movement of the rotating cutters in relation to the face of the piece of sign material to cut a line of the selected width.

2. The method of claim 1, wherein the cutters each have a thickness dimension between opposing faces of each respective cutter;

further comprising the step of holding the cutters in a fixed structure having a gap approximating the thickness of the two cutters to secure the two cutters during engraving operations.

3. The method of claim 1, wherein the two cutters are oriented for rotation around an axis of rotation that is closer to horizontal than to vertical; and wherein the relative movement of the rotating cutters is caused by feeding the sign material upwardly past the rotating cutters.

4. Apparatus for automatic line width adjustment for engraving a line on a sign blank, the apparatus comprising:

a first cutter assembly for movement along a first path, the first cutter assembly having a first cutter tip;

a second cutter assembly for movement along a second path in face-to-face opposing relationship to the first cutter assembly, the second cutter assembly having a second cutter tip and the second path lying adjacent the first path and having a portion running alongside a portion of the first path;

a mechanism for advancing the first and second cutter assemblies along their respective paths to move the first and second cutter tips between a home position and a fully advanced position and control the spacing between the first and second cutter tips;

a mechanism for releasing the first cutter assembly and the second cutter assembly to allow the first and second cutter tips to return to the home position; and a control mechanism for operating, in the alternative, either the mechanism for advancing or the mechanism for releasing, to control the spacing between the first and second cutter tips.

5. The apparatus of claim 4, further comprising:

a spindle drive for rotating the two cutters with the selected spacing between the first and second cutter tips to effect a cutting width; and a transverse drive for moving the rotating cutters over the face of a sign blank to cut a line of the selected width.

6. The apparatus of claim 4, wherein in the home position the first and second cutter tips are in a closed-in position and wherein in the fully advanced position the cutter tips are spaced in a wide-open position.

* * * * *